INVENTORS
JULIAN BROWN, Jr.
BOBBY J. DUNCAN
BY
John H. Gallagher
ATTORNEY

INVENTORS
JULIAN BROWN, Jr.
BOBBY J. DUNCAN
BY
John H. Gallagher
ATTORNEY

INVENTORS
JULIAN BROWN, Jr.
BOBBY J. DUNCAN
BY
John H. Gallagher
ATTORNEY

INVENTORS
JULIAN BROWN, Jr.
BOBBY J. DUNCAN
BY
John H. Gallagher
ATTORNEY

United States Patent Office 3,128,439

Patented Apr. 7, 1964

3,128,439

BROADBAND GYROMAGNETIC COUPLING LIMITER EMPLOYING A PLURALITY OF NARROW-LINEWIDTH GYROMAGNETIC ELEMENTS

Julian Brown, Jr., and Bobby J. Duncan, Clearwater, Fla., assignors to Sperry Rand Corporation, Great Neck, N.Y., a corporation of Delaware Filed Aug. 10, 1962, Ser. No. 216,179
6 Claims. (Cl. 333—24.2)

This invention relates to a passive electromagnetic wave limiter and more particularly to a broadband gyromagnetic coupling limiter in which the limiting action results from the nonlinear effects of certain gyromagnetic materials.

A limiter is a device that passes substantially unaffected electromagnetic waves below a certain threshold or critical power level but attenuates waves that exceed the threshold level so that the output waves from the limiter never will exceed the threshold power level. These power limiters are used in various ways in electromagnetic wave systems, and in particular may be used in radar and communication systems to protect the amplifiers and sensitive crystal detectors of the receivers in such systems. In most conventional radar and communication systems, the well-known TR tubes are employed to protect the receiver from burnout by substantially blocking high power electromagnetic waves from the receiver channel. These TR tubes, however, suffer from the disadvantages that they have relatively short lifetimes, and pass to the receiver spikes of high power energy that occur at the leading edges of high power pulses. It is standard procedure to continuously replace the TR tube in an operating radar system to assure optimum operating conditions. This continuous replacement can amount to a high cost in terms of parts and labor within a relatively short time. The passive limiter of the type constructed in accordance with the present invention is a decided improvement over the presently used TR tube in that it has an extremely long lifetime and requires no active voltage source to maintain it in operating condition. Further, the limiter of this invention, or a combination of two or more, can be operated so as to substantially eliminate the above-mentioned voltage spike which is detrimental to the crystal detector of the receiver. Further advantages of the solid state limiter of this invention is that it does not sputter or misfire as do the conventional TR tubes, and the recovery time of a solid state limiter is less than that of the TR tube and thus is particularly useful in short range radar systems.

The limiter of this invention utilizes one of the nonlinear effects of certain gyromagnetic materials which under proper conditions can be made to occur at relatively low power levels. As is known, these nonlinear effects may take either of two different forms. First, an absorption that limits the power that exceeds a certain critical power level. This absorption, known as subsidiary resonance, will occur under the proper conditions with a magnetic biasing field for the gyromagnetic material that is approximately one-half the field strength required for gyromagnetic resonance of that material. A second type of nonlinear effect is associated with a decline in the susceptibility of the gyromagnetic material which sets in when the power level of the wave exceeds a certain critical level. These nonlinear effects are discussed by H. Suhl in an article appearing on pages 209–227 of the April 1957 Journal of Physics and Chemistry of Solids.

Briefly stated, these nonlinear effects may be explained in terms of spin wave theory. Under ideal conditions for gyromagnetic resonance in a ferrimagnetic material, the exciting R.F. wave is essentially uniform throughout the sample of material. Under such conditions the magnetization vectors associated with the electron spins precess uniformly, i.e., in phase with each other, throughout the material. For this uniform precession, the magnetization of the material as a whole can be considered as a single magnetization vector. Such a mode of precession, however, is not the only possible one for the system of spins, and in fact is only one of an infinite number of proper spin modes of the system. The other modes, generally called spin waves, are characterized by the fact that the individual magnetic vectors no longer are in phase with each other. These spin waves always will be present to some extent, and are excited in a number of ways. For example, at high power levels of electromagnetic waves incident on the ferrimagnetic material, a very large exciting force sets in. Beyond certain critical R.F. magnetic field levels, time-varying coupling terms between the uniform precession and certain spin waves cause a rapid transfer of energy to take place from the uniform precession to the pertinent spin wave, giving rise to a rapid growth of these waves.

There are an infinite number of spin waves possible. For a spherically shaped sample of ferrimagnetic material, these spin waves lie within definite frequency boundaries, as illustrated in FIG. 1, wherein the spectrum lies within the frequency limits $(\omega_H - N_Z\omega_M)$ and $$[(\omega_H - N_Z\omega_M)\ (\omega_H - N_Z\omega_M + \omega_M)]^{1/2}$$

The frequencies of the spin waves that fall within the boundaries illustrated in FIG. 1 are defined by the following equation:

$$\omega_k^2 = (\omega_H - \omega_M N_Z + \omega_{ex} l^2 k^2)(\omega_H - \omega_M N_Z + \omega_{ex} l^2 k^2 + \omega_M \sin^2\theta_k \qquad (1)$$

where $\omega_k$=spin wave frequency, $k=2\pi/\lambda$, $k$=spin wave number, $\lambda k$=distance between spins that are in phase with one another, $\omega_H=\gamma H$, where H is the applied field, $\omega_M=\gamma 4\pi M_s$, $N_Z$=demagnetizing factor parallel to the D.C. field, $\omega_{ex}=\gamma H_{ex}$, $H_{ex}$=internal exchange field ($H_{ex}\sim 10^6$ gauss), $\theta_k$=angle between D.C. applied field and direction of $\vec{k}$, $l$=lattice constant of material, and $\gamma$ is the gyromagnetic ratio.

The nonlinear high power effects observed in ferrimagnetic material are due to the coupling of the uniform precession to two distant groups of spin wave; those whose frequencies are equal to the frequency of the R.F. wave incident on the ferrimagnetic sample, i.e., $(\omega_k=\omega)$, and those spin waves whose frequencies are equal to one-half the frequency of the incident wave, i.e., $$\left(\omega_k=\frac{\omega}{2}\right)$$

Based on the equation of motion of the spin waves as set forth in the above-mentioned article, the following expression is derived for the critical level, or threshold level, of the R.F. magnetic field which will cause instability in the precessional motion of the magnetization vectors associated with the spinning electrons, $$h_c=\frac{2\omega_k\left\{\left[(\gamma\Delta H_k)^2+\left(\frac{\omega}{2}-\omega_k\right)^2\right][(\gamma\Delta H)^2+(\omega-\omega_{res})^2]\right\}^{1/2}}{\gamma\omega_M\sin\theta_k\cos\vartheta_k[\omega_k+\omega_H-\omega_M N_Z+\omega_{ex}l^2k^2]} \quad (2)$$

where $\Delta H$=conventional uniform precessional linewidth, and $\Delta H_k$="spin wave linewidth."

When spin waves at one-half the frequency of the incident R.F. waves are excited and are within the bounds of the spin wave spectrum illustrated in FIG. 1, a first type of nonlinear process evidenced by an absorption of power and known as a subsidiary resonance occurs at a magnetic biasing field approximately one-half of that required for the conventional gyromagnetic resonance. The subsidiary resonance limiting phenomenon, however, cannot be used in a practical way in the gyromagnetic coupling devices of the present invention. The transfer of energy between transmission lines in the devices of this invention is through the mechanism of the precessing magnetic moments associated with the spinning electrons of the gyromagnetic material, and the greater the angles of precession the greater the amount of energy transferred. At subsidiary resonance, the angles of precession are not as great as at the main gyromagnetic resonance condition so that efficient coupling of energy between transmission lines cannot be achieved.

The second type of nonlinear process, the one utilized in the present invention, is the decline of the main resonance susceptibility which occurs when the gyromagnetic medium is magnetically biased to gyromagnetic resonance, that is, when $\omega=\omega_{res}$. Two different situations can exist under this condition. The first situation arises when spin waves at one-half the frequency of the incident electromagnetic waves fall outside of the spin wave frequency spectrum illustrated in FIG. 1, that is, $$\frac{\omega_{res.}}{2}<\omega_H-N_Z\omega_M \quad (3)$$

The second situation results when the gyromagnetic medium is magnetically biased to resonance and the spin waves at one-half the frequency of the incident waves also fall within the frequency spectrum illustrated in FIG. 1. That is, $$\frac{\omega_{res.}}{2}>\omega_H-N_Z\omega_M \quad (4)$$

In the first of these situations the following conditions will exist: $\omega=\omega_{res}=\omega_k$, and $$\frac{\omega_{res.}}{2}\neq\omega_k$$

Further, the expression $$\frac{\omega_{res.}}{2}<\omega_H-N_Z\omega_M$$

must be compatible with the Kittel equation for gyromagnetic resonance, which for an axially symmetric geometry, is expressed by $$\omega_{res}=\omega_H-(N_Z-N_T)\omega_M \quad (5)$$

The simultaneous solution of Equations 3 and 5 requires that $$\frac{\omega_{res.}}{2}>N_T\omega_M$$

where $N_T$ is the transverse magnetization factor. With these conditions satisfied, Equation 2 can be minimized to the following approximate expression which defines the critical level of the incident R.F. magnetic field at which limiting action sets in $$h_c=\frac{\Delta H}{2}\sqrt{\frac{\Delta H_k}{4\pi M_s}} \quad (6)$$

In the second situation in which the spin waves at one-half the frequency of the incident waves also are within the spin wave frequency spectrum, the following conditions will prevail: $\omega=\omega_{res}=\omega_k$, and $$\frac{\omega_{res.}}{2}=\omega_k$$

Simultaneously solving Kittel's gyromagnetic resonance equation with the expression $$\frac{\omega_{res.}}{2}>\omega_H-N_Z\omega_M$$

requires that $$\frac{\omega_{res.}}{2}>N_T\omega_M$$

in order that the nonlinear process may occur. The frequency equal to $2N_T\omega_M$ will be referred to hereafter as the critical frequency $f_c$. With these conditions satisfied, Equation 2 above may be minimized to give the approximate value of the critical magnetic field as follows:

$$h_c\approx\frac{\Delta H\Delta H_k}{8\pi M_s} \quad (7)$$

Limiters have been proposed which make use of the above-described principles, but because of the manner in which these principles have been put into practice, these devices have been very narrow bandwidth in nature.

It therefore is an object of this invention to provide a relatively simple electromagnetic wave power limiter that is effective over a relatively broad range of frequencies.

It is a further object of this invention to provide a broadband gyromagnetic coupling limiter.

Another object of the invention is to provide a relatively simple and easy to construct gyromagnetic coupling devices whose output remains below a critical pulse level over a relatively broad frequency range.

Another object of this invention is to provide an electromagnetic wave limiting device that has an extremely rapid recovery time.

The present invention can be described by referring to the accompanying drawings wherein.

Figure 2:
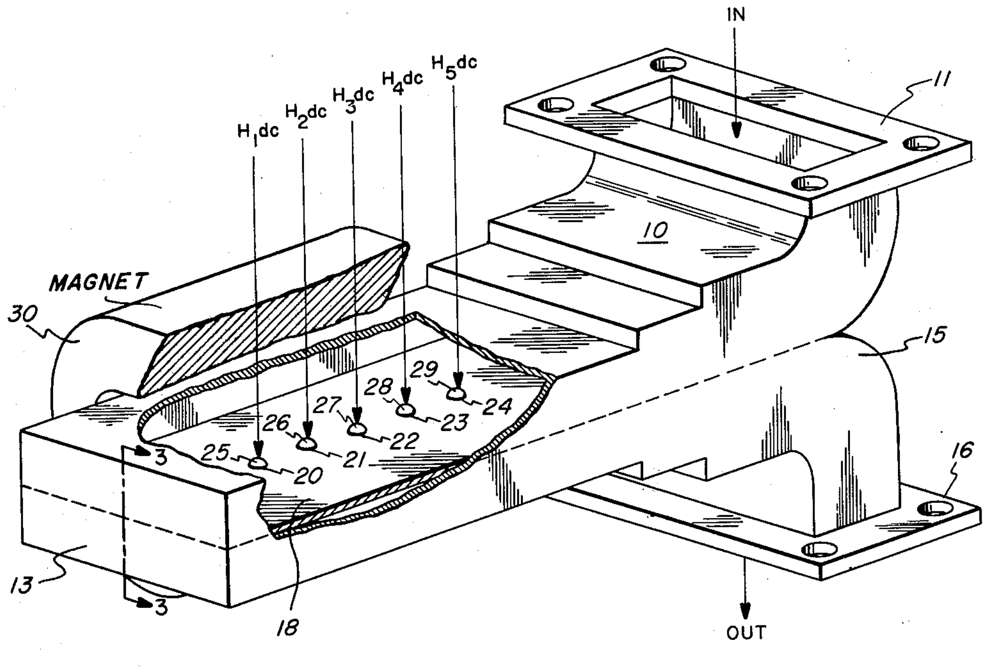
FIG. 2 is a plan view, partially broken away, of a rectangular waveguide embodiment of the present invention.

Referring now in detail to FIG. 2, the gyromagnetic coupler limiter of this invention is comprised of a first waveguide section 10 having a coupling flange 11 at one end and being short-circuited by a conductive plate 13 at the opposite end. A second rectangular waveguide section 15, which is substantially identical to waveguide section 10, has a coupling flange 16 at one end and is short-circuited at its opposite end by the conductive plate 13. Both waveguides propagate electromagnetic waves therein in the dominant $TE_{10}$ mode. A thin septum of conductive material 18 serves as the common broad wall between waveguide sections 10 and 15, and an array of small circular apertures 20–24 are positioned along the center line of septum 18, and a number of small spherical elements of gyromagnetic material 25–29 are respectively positioned in the circular apertures 20–24. Elements 25–29 of the gyromagnetic material thus are positioned in a region where electromagnetic waves in the waveguides 10 and 15 are linearly polarized. Elements 25–29 preferably are small highly-polished spheres of an extremely narrow linewidth gyromagnetic material such as yttrium iron garnet material. Each of these spheres 25–29 is magnetically biased in a vertical direction by means of a permanent magnet 30 which may be a C-magnet whose poles are adjacent the top and bottom walls of waveguides 10 and 15, respectively. Spheres of gyromagnetic material 25–29 are immersed in the respective magnetic biasing fields $H_{1dc}$–$H_{5dc}$ whose strengths differ from each other for reasons to be explained hereinbelow.

Figure 3:
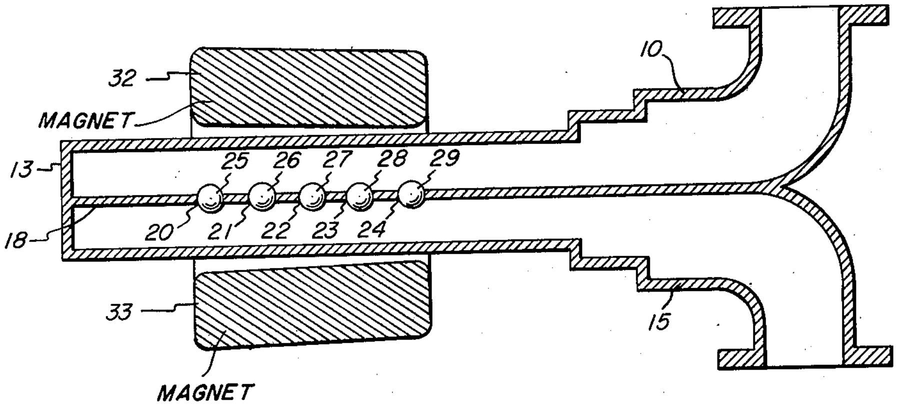
FIG. 3 is a cross-sectional view of the device of FIG. 2 taken at section 3—3.

As seen in FIG. 3, spheres 25–29 extend into both of the waveguides 10 and 15. These spheres may have diameters of the order of .020 inch. It therefore is evident that conductive spectrum 18 should be extremely thin.

The device illustrated in FIGS. 2 and 3 acts as a gyromagnetic coupler to couple electromagnetic waves from input waveguide 10 to output waveguide 15 through the mechanism of the precessing magnetic moments associated with the spinning electrons of spheres 25–29. That is, each one of these spheres will be magnetized to the main gyromagnetic resonance condition so that the magnetic moments of the spinning electrons of the material precess about their spin axes with relatively large angles of precession. This precession occurs throughout the entire volume of each sphere and is the mechanism for transferring energy from waveguide 10 to waveguide 15. That is, electromagnetic energy couples from waveguide 10 to the uniform precession of the magnetic moments within spheres 25–29, and in turn from the uniform precessions into waveguide 15. The size of apertures 20–24 are made quite small so that in the absence of the gyromagnetic coupling provided by spheres 25–29, waveguide sections 10 and 15 are substantially decoupled from each other.

Each of the spheres 25–29 may be considered as a resonant cavity whose unloaded Q is equal to $$\frac{f_0}{\gamma \Delta H}$$

where $f_0$ is the resonance frequency, and its transmission characteristics may be evaluated by following the type of development presented in section 9.2 of Microwave Measurements, by Ginzton, published 1957 by McGraw-Hill Book Company. It is found that the coupling loss increases with increasing linewidth of the gyromagnetic material. Therefore, a low loss, narrow linewidth material is required. Further, the limiting threshold increases approximately as the cube of the radius of the sphere, so that the spheres should be small to keep the limiting threshold low.

From Equation 2 it may be seen that in order to achieve limiting action at low power levels, that is, small values of $h_c$, the uniform precessional linewidth ΔH should be as small as possible. However, the operating bandwidth of a device employing the ferrimagnetic materials also is a function of these two terms. Therefore, the factor that allows a ferrimagnetic device to operate successfully as a low loss limiter at low power levels inherently restricts the operating bandwidth to a narrow frequency range. In ferrimagnetic limiters constructed in the past, this indeed has been true, and increased bandwidth of operation could be achieved only at the expense of raising the critical power level of limiting. Devices constructed in accordance with the present invention, however, will operate successfully as an efficient gyromagnetic coupling limiter over a relatively broad frequency range without any sacrifice in a critical level of limiting and, therefore, may take full advantage of the very narrow linewidth gyromagnetic materials which recently have become available.

In accordance with this invention, the gyromagnetic coupling action provided by spheres 25–29 is effective over a relatively broad and continuous range of frequencies by uniformly exciting each sphere with R.F. electromagnetic waves and magnetizing each of these spheres to gyromagnetic resonance at a different frequency within the broad range of the desired operating frequency band. That is, sphere 25 will be resonant within a narrow band centered at a frequency $f_1$, sphere 26 will be resonant within a narrow band centered at frequency $f_2$, and so on, in order that the resonant frequencies of all the spheres substantially completely fill the bandwidth of the desired operating range.

One means for resonanting each of these spheres at a different frequency is to provide a tapered biasing magnetic field whose strength varies throughout the length of the waveguide section occupied by the spheres. This may be done in the manner illustrated in FIG. 3, wherein the pole pieces 32 and 33 of C-magnet 30 are physically tapered. Other means may be used for varying the resonance frequency of the different spheres, for example by varying the composition of the gyromagnetic material, and/or the size and shape of the different spheres.

Figure 4:
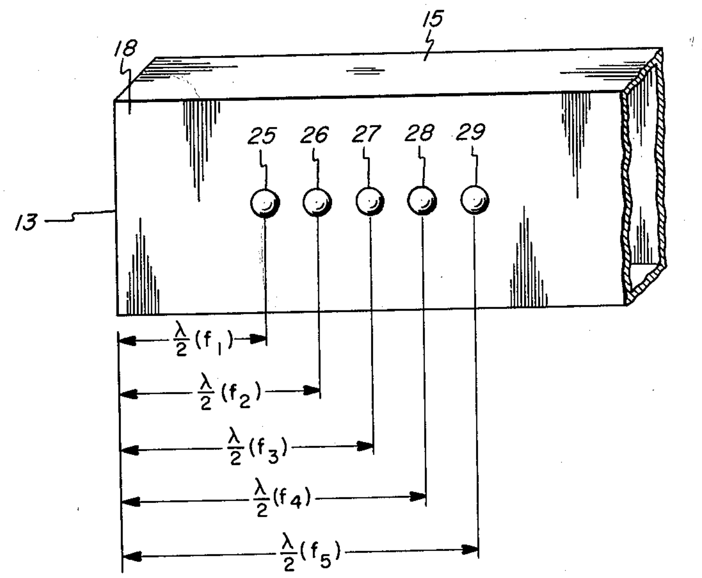
FIG. 4 is a top view of a portion of the common broad wall of the device of FIG. 2, and is used to illustrate the spacing of the gyromagnetic elements used in the present invention.

In order to achieve efficient gyromagnetic coupling through the resonant spheres 25–29, they must be tightly coupled to both of the waveguides 10 and 15, and therefore must be located at respective positions where the R.F. magnetic field of the waves of their respective resonance frequency is a maximum. This is achieved by spacing each sphere from the short-circuited end of each waveguide by a distance substantially equal to an integral number of half waveguide wavelengths at the frequency to which the particular sphere is resonant. This spacing of the resonant spheres is illustrated in FIG. 4, wherein it is seen that sphere 25, which is resonant at frequency $f_1$, is positioned from the short-circuit plate 13 by a distance equal to a one-half wavelength at frequency $f_1$, sphere 26 is spaced from plate 13 by a distance equal to one-half wavelength at frequency $f_2$, and so on. In this manner, efficient gyromagnetic coupling of the waves throughout the frequency spectrum $f_1$–$f_5$ is provided between the waveguides 10 and 15.

Should the spacing between adjacent spheres become too small for practical purposes when each is positioned at the first half wavelength of its resonance frequency from short-circuiting plate 13, greater spacing between spheres can be accomplished by placing some of the spheres at multiples of half wavelengths from the shorted ends of the waveguides. The increased spacing also may be accomplished by increasing the waveguide wavelength, as by decreasing the broad dimension of the waveguides, still keeping it above the cut off dimension.

In order to obtain substantially uniform coupling and limiting throughout the frequency range of interest, the values of coupling of each of the spheres should be substantially equal. In practice this is best accomplished empirically by adjustments of one or more of the parameters of aperture and sphere size, biasing magnetic field, and material composition.

The R.F. magnetic field should uniformly excite each sphere so that the coupling action between waveguides results from transfer of energy via the main spin waves at $\omega = \omega_{res}$.

Figure 1:
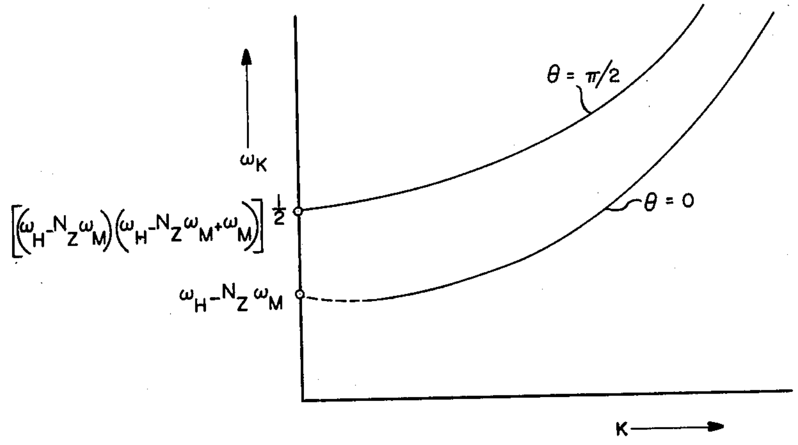
FIG. 1 is a graph used in explaining the principles of operation of the devices of this invention

When spheres 25–29 are magnetized by their respective magnetic fields $h_{1dc}$–$h_{5dc}$ to their respective main gyromagnetic resonance conditions, and when their sizes, shapes, and compositions are correctly proportioned as described previously, and when electromagnetic waves coupled into waveguide 10 through coupling flange 11 exceed the critical power level, the waves gyromagnetically coupled through spheres 25–29 will be limited to the level of $h_c$ expressed by Equation 6 if the half-frequency spin waves $$\omega_k = \frac{\omega_{res.}}{2}$$

fall outside of the spin wave frequency spectrum illustrated in FIG. 1, or will be limited to the level of $h_c$ expressed by Equation 7 if the half frequency spin waves fall within the spin wave frequency spectrum illustrated in FIG. 1.

As discussed previously, the limiting actions associated with Equations 6 and 7 result from the decline of the susceptibility of the gyromagnetic medium in either of two ways. For the conditions that exist to make Equation 7 applicable, i.e.

$$\frac{\omega_{res.}}{2} < N_t\omega_M$$

the frequency $f$ of the incident waves is less than the critical frequency $f_c$, and the decline in susceptibility is in accordance with the expression $$\frac{X''_{h>hc}}{X''_0} = \sqrt{\frac{P_c}{P}} \qquad (8)$$

where $X''_0$=susceptibility at low power, $P$=incident R.F. power, and $P_c$=approximate power level at which the susceptibility begins to decline. When the frequency of the incident R.F. waves is greater than the critical frequency, i.e., $f>f_c$, or $$\frac{\omega_{res.}}{2} > N_t\omega_M$$

the following equation expresses the decline in susceptibility, $$\frac{X''_{h>hc}}{X''_0} = \frac{1}{\sqrt{2}}\frac{P_c}{P}\left\{\left[1+4\left(\frac{P}{P_c}\right)^2\right]^{1/2}-1\right\}^{1/2} \qquad (9)$$

Figure 6:
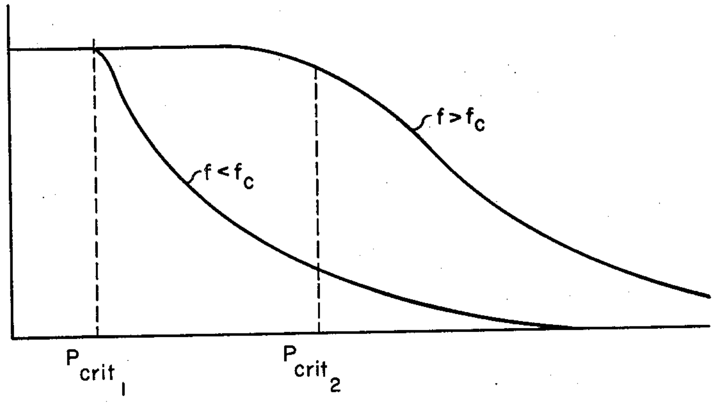
FIG. 6 is a plot of curves used in explaining the operating characteristics of devices constructed in accordance with the present invention.

Equations 8 and 9 are plotted in FIG. 6 which shows that limiting action sets in at a lower power level when the half frequency spin waves are within the spin wave frequency spectrum of FIG. 1, i.e., conditions required for Equation 7 to be valid.

Operation of the limiter of this invention with the spheres magnetically biased to gyromagnetic resonance, in the manner just described, is the preferred operating condition because the gyromagnetic coupling action is optimum under this condition. The gyromagnetic coupling is a function of the angle of precession of the magnetic moments of the spinning electrons and this angle is maximum, for a given power level, at resonance.

Figure 5:
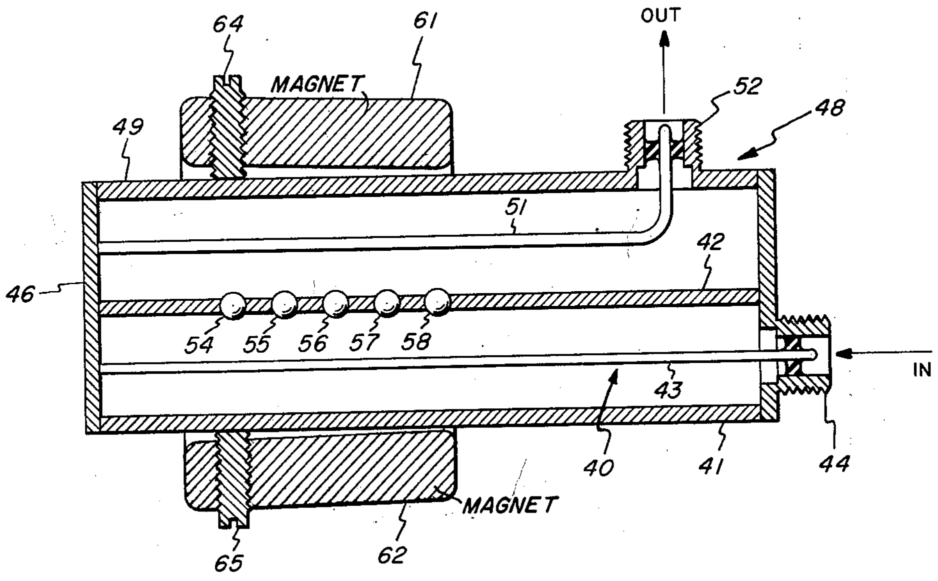
FIG. 5 illustrates other embodiments of this invention adapted for use in TEM mode transmission lines.

The principles of this invention also may be utilized to obtain broadband gyromagnetic coupling limiting action in TEM mode transmission line devices. A cross-sectional view of a device of this type is illustrated in FIG. 5, which may represent a coaxial line device or a strip transmission line device, but for the purposes of the following discussion will be assumed to be a strip transmission line device. The device is comprised of two parallel disposed double ground plane strip transmission lines wherein the first line 40 is comprised of broad ground planes 41 and 42, and the narrow strip conductor 43 extends longitudinally between and parallel to ground plane conductors 41 and 42. A coaxial line connector 44 is connected to said conductors at the right end of the line, and the left end of the line is short-circuited by a conductive plate 46. The second line 48 is comprised of ground plane conductors 49 and 42, the latter serving as a common ground plane conductor to both lines 40 and 48. Center strip conductor 51 extends between ground plane conductors 42 and 49 in the customary manner, and is parallel to center strip conductor 43 of the bottom line 40. A coaxial line connector is connected to the right end of top line 48, and the left end is short-circuited by conductive plate 46. Disposed along the center line of common ground plane conductor 42 is an array of small highly polished spheres 54–58 of a suitable low loss, narrow linewidth gyromagnetic material, such as single crystal yttrium iron garnet. Spheres 54–58 perform the broadband gyromagnetic coupling and limiting action between the transmission lines 40 and 48 in the same manner as do the spheres 25–29 in the device illustrated in FIG. 2.

In operation, spheres 54–58 are magnetized to their respective gyromagnetic resonance frequencies $f_1$–$f_5$ that comprise a substantially continuous, broad range of frequencies. Each of the spheres is spaced from the short-circuited end of each strip transmission line by a distance substantially equal to an integral number of half wavelengths at its respective gyromagnetic resonance frequency in order that each sphere will be at a position of maximum R.F. magnetic field, thus assuring that the spheres are tightly coupled to both lines 40 and 48. In accordance with the principles discussed above, either of the two types of limiting actions are possible to obtain limiting at the levels expressed by Equations 6 or 7. The magnetizing fields for spheres 54–58 are provided by a permanent magnet whose pole pieces 61 and 62 are positioned adjacent ground plane conductors 49 and 41. Inserts 64 and 65 of magnetic material threadably engage pole pieces 61 and 62 and provide means for adjusting the strength of the magnetic field immersing sphere 54. Additional magnetic inserts may be provided if necessary.

Figure 7:
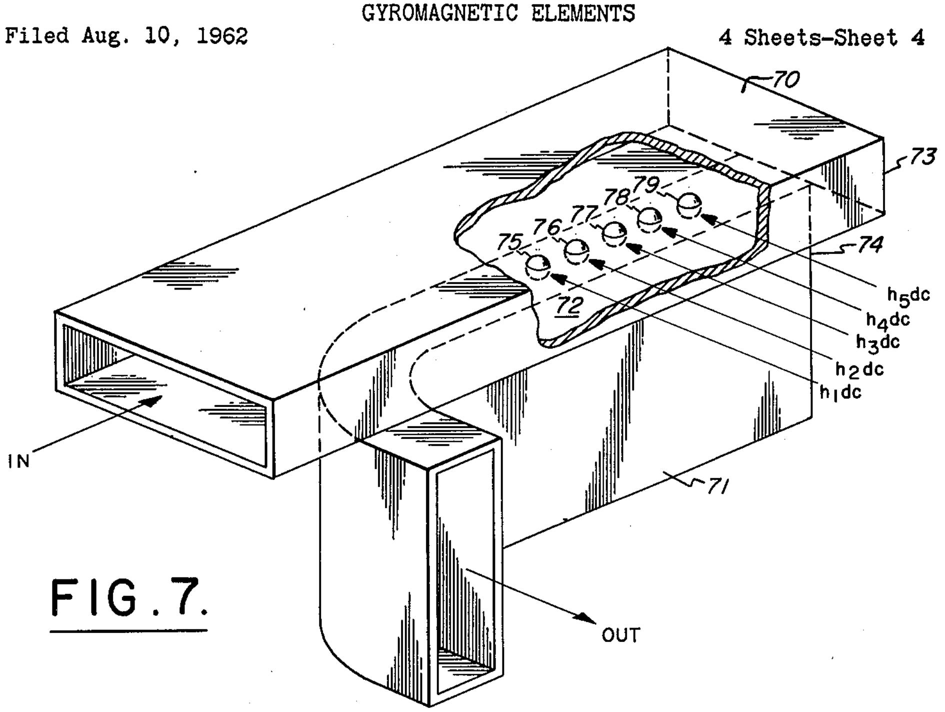
FIG. 7 is an alternative embodiment of the device of FIG. 1 in which the coupling between rectangular waveguides is from broad wall to narrow wall.

Another embodiment of the present invention is illustrated in FIG. 7 wherein rectangular waveguide sections 70 and 71 are positioned perpendicularly with respect to each other and share a common wall 72 that forms the bottom broad wall of waveguide 70 and narrow wall of waveguide 71. Both waveguides are short-circuited at their respective ends 73 and 74. A plurality of small resonant spheres 75–79 of a low loss narrow linewidth gyromagnetic material are positioned in spaced apart relationship along the center line of common wall 72 and are magnetized to different gyromagnetic resonance frequencies, in accordance with this invention, by their respective magnetizing fields $h_{1dc}$–$h_{5dc}$, for example. Each of the resonant spheres 75–79 is spaced from the short-circuited ends 73 and 74 of the respective waveguides by a distance substantially equal to an integral number of half waveguide wavelengths at its respective gyromagnetic resonance frequency in order that each of the spheres will be at a position of maximum R.F. magnetic field, thus assuring that the spheres are tightly coupled to both of the waveguides 70 and 71. Electromagnetic waves propagate in both waveguides 70 and 71 in the dominant $TE_{10}$ mode. As in the embodiments described above, spheres 75–79 will gyromagnetically couple electromagnetic waves over a relatively broad range of frequencies from input waveguide 70 to output waveguide 71, and in the manner previously described, spheres 75–79 will limit the power coupled therethrough to the previously described critical power level. Because the planes of the magnetic field loops in waveguides 70 and 71 are perpendicular to each other, the isolation between the waveguides 70 and 71 normally will be very high in the absence of the gyromagnetic coupling provided by spheres 75–79.

Figure 8:
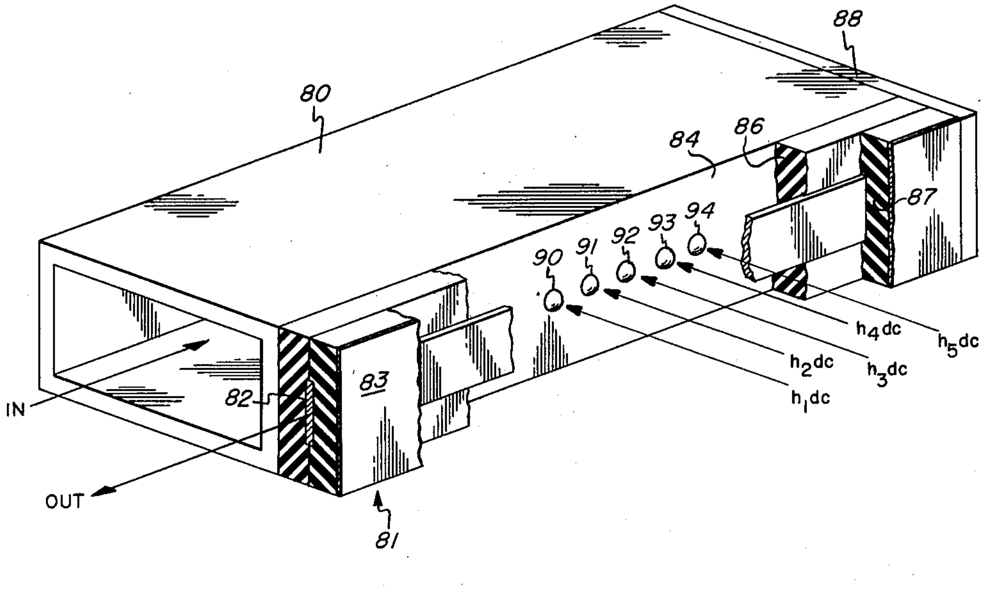
FIG. 8 is another embodiment of the present invention illustrating coupling between uniconductor waveguide and strip transmission line waveguide.

Another embodiment of the invention is illustrated in FIG. 8 wherein the gyromagnetic coupling limiting action is accomplished between input uniconductor rectangular waveguide 80 and a strip transmission line 81. Strip transmission line 81 is of the double ground plane type wherein conductive plane 83 forms one ground plane and the conductive narrow wall 84 of rectangular waveguide 80 forms the other ground plane. Strips of a low loss dielectric material 86 and 87 separate the center strip conductor 82 from the ground plane conductors 83 and 84. Both transmission lines are short-circuited at their right ends by conductive plate 88. Small spheres 90–94 of low loss narrow linewidth gyromagnetic material are positioned in apertures in the narrow wall 84 of uniconductor waveguide 80 and provide the means for gyromagnetically coupling energy between the waveguides. Each of the spheres 90–94 is magnetically biased in a transverse direction by the magnetic fields $h_{1dc}$–$h_{5dc}$ to different gyromagnetic resonance frequencies which form a substantially continuous band of frequencies with the desired operating range. Each of the spheres 90–94 is positioned from short-circuiting plate 88 by a distance substantially equal to an integral number of half wavelengths at its respective gyromagnetic resonance frequency. In the design of the gyromagnetic coupling member of FIG. 8, the different velocities of propagation of electromagnetic waves in the two waveguides 80 and 81 must be taken into account in selecting the proper spacing of the spheres 90–94 from short-circuiting plate 88.

Because the magnetic fields in uniconductor waveguide 80 and strip transmission line 81 normally are perpendicular to each other, there will be high isolation between the two transmission lines in the absence of the gyromagnetic coupling provided by spheres 90–91. The operation of the device of FIG. 8 is similar to the operation of the previously described embodiments.

Efficient broadband gyromagnetic coupling requires that each of the following conditions be met, and in reviewing the different embodiments of the invention described above it will be seen that all of the following conditions are in fact met in each of the devices.

(a) The gyromagnetic medium must possess a narrow linewidth.
(b) The gyromagnetic medium must be resonant.
(c) Each of the gyromagnetic mediums must be resonant at a different frequency within a substantially continuous range of frequencies.
(d) The component of the R.F. magnetic field of each waveguide that couples to the gyromagnetic medium must be perpendicular to the biasing D.C. magnetic field.
(e) The gyromagnetic coupling medium must be located in a region of maximum R.F. magnetic field.
(f) The R.F. magnetic field should be substantially uniform on each gyromagnetic medium.
(g) The two transmission lines must be substantially decoupled from each other in the absence of the gyromagnetic coupling action provided by the gyromagnetic mediums.

While the invention has been described in its preferred embodiments it is to be understood that the words which have been used are words of description rather than of limitation and that changes within the purview of the appended claims may be made without departing from the true scope and spirit of the invention in its broader aspects.

What is claimed is:

1. A gyromagnetic coupling power limiting electromagnetic wave transmission line device comprising,
first and second conductively bounded electromagnetic wave transmission lines for propagating electromagnetic waves within a given frequency range,
said two transmission lines being disposed adjacent each other and having a common conductive boundary separating them over at least a portion of their lengths,
each of said transmission lines being short-circuited at one of its ends and having a transmission line coupling means at its opposite end,
a plurality of small elements of low loss, narrow linewidth gyromagnetic material that exhibits gyromagnetic effects to waves within said frequency range disposed in spaced-apart relationship in said common conductive boundary and in communication with both of said transmission lines,
means for magnetizing each of said gyromagnetic elements in a direction transverse to a component of the magnetic field of the electromagnetic waves incident on said elements,
the size, shape and composition of each of said elements and the strength of the magnetizing field immersing each element being proportioned so that each element is gyromagnetically resonant at a different frequency within a continuous relatively broad range of frequencies within said given frequency range and exhibits power limiting characteristics for waves at its respective resonant frequency that exceed a critical power level,
each of said spheres being spaced from the short-circuited end of each transmission line by integral number of transmission line half wavelengths at its respective gyromagnetic resonant frequency.

2. The combination claimed in claim 1 wherein said two transmission lines are parallel disposed TEM mode transmission lines.

3. The combination claimed in claim 1 wherein said two transmission lines are rectangular uniconductor waveguides parallel disposed with respect to each other, and said common conductive boundary is a common broad wall.

4. The combination claimed in claim 1 wherein said two transmission lines are rectangular uniconductor waveguides and said common conductive boundary comprises a broad wall of one waveguide and a narrow wall of the other waveguide.

5. A gyromagnetic coupling limiter comprising first and second parallel disposed rectangular waveguide sections having a common broad wall therebetween,
means for short-circuiting one end of each of said waveguides,
the short-circuits in said two waveguides lying in a common transverse plane therethrough,
an input terminal coupled to the opposite end of said first waveguide and an output terminal coupled to the opposite end of said second waveguide, a plurality of small circular apertures disposed in spaced relationship along the longitudinal center line of said thin common broad wall,
said apertures being small enough so that, by themselves, they couple a negligible amount of energy between said waveguides,
a plurality of small highly polished spheres of a low loss, narrow linewidth gyromagnetic material respectively positioned in said apertures and in communication with both of said waveguides,
means for magnetizing each of said spheres in a direction normal to said common broad wall to its gyromagnetic resonance condition,
said spheres having different gyromagnetic resonance frequencies all of which fall within a relatively broad continuous range of frequencies,
each of said spheres being positioned from the short-circuited ends of the waveguides by a distance substantially equal to an integral number of half waveguide wavelengths for waves at its respective gyromagnetic resonance frequency,
the size, shape and composition of each of said spheres of gyromagnetic material being proportioned with respect to its magnetizing field and its gyromagnetic resonance frequency so that each sphere exhibits power limiting characteristics for electromagnetic waves at its respective gyromagnetic resonance frequency that exceed a critical power level.

6. A gyromagnetic coupling power limiting electromagnetic wave transmission line device comprising,
first and second parallel disposed strip transmission lines each having a strip conductor and at least one ground plane conductor,
said two lines having a common ground plane conductor therebetween,
means for short-circuiting one end of each of said strip transmission lines,
transmission line connecting means coupled to the opposite end of each of said transmision lines, a plurality of small elements of a low loss, narrow linewidth gyromagnetic material disposed in spaced-apart relationship along the longitudinal centerline of said common ground plane and extending therethrough into communication with the wave propagating region of both of said strip transmission lines, means for magnetizing each of said elements to a different gyromagnetic resonance frequency within a continuous relative broad range of frequencies, each of said element being located from the short-circuited end of each strip transmission line by a distance to place it at a position of maximum R.F. magnetic field for waves at its respective gyromagnetic resonance frequency, thereby to closely couple said spheres to both of said strip transmission lines, the size, shape and composition of each of said elements and the strength of the magnetizing field immersing each element being proportioned so that each element exhibits power limiting characteristics for waves at its respective gyromagnetic resonant frequency that exceed a critical power level.

No references cited.